UNITED STATES PATENT OFFICE.

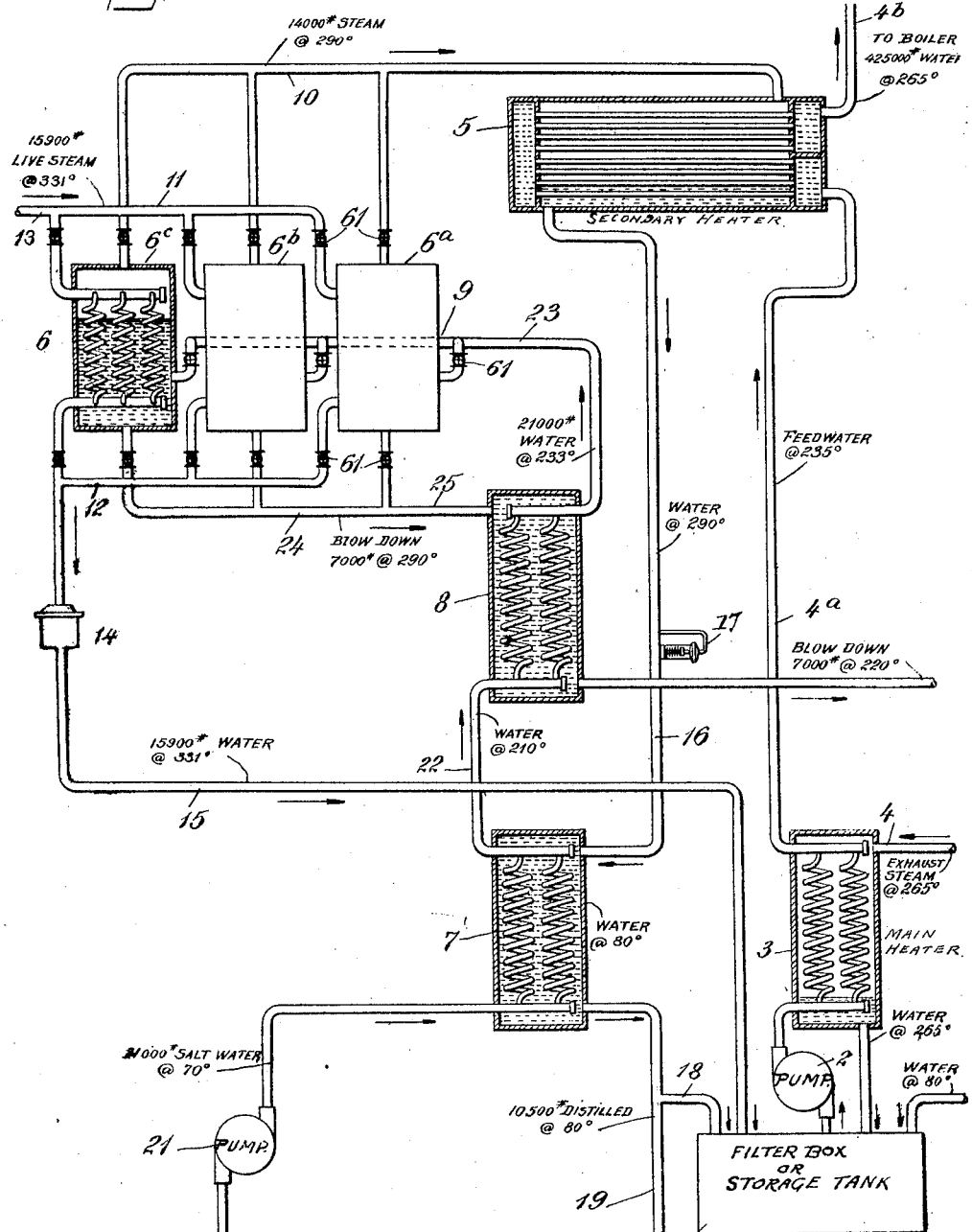

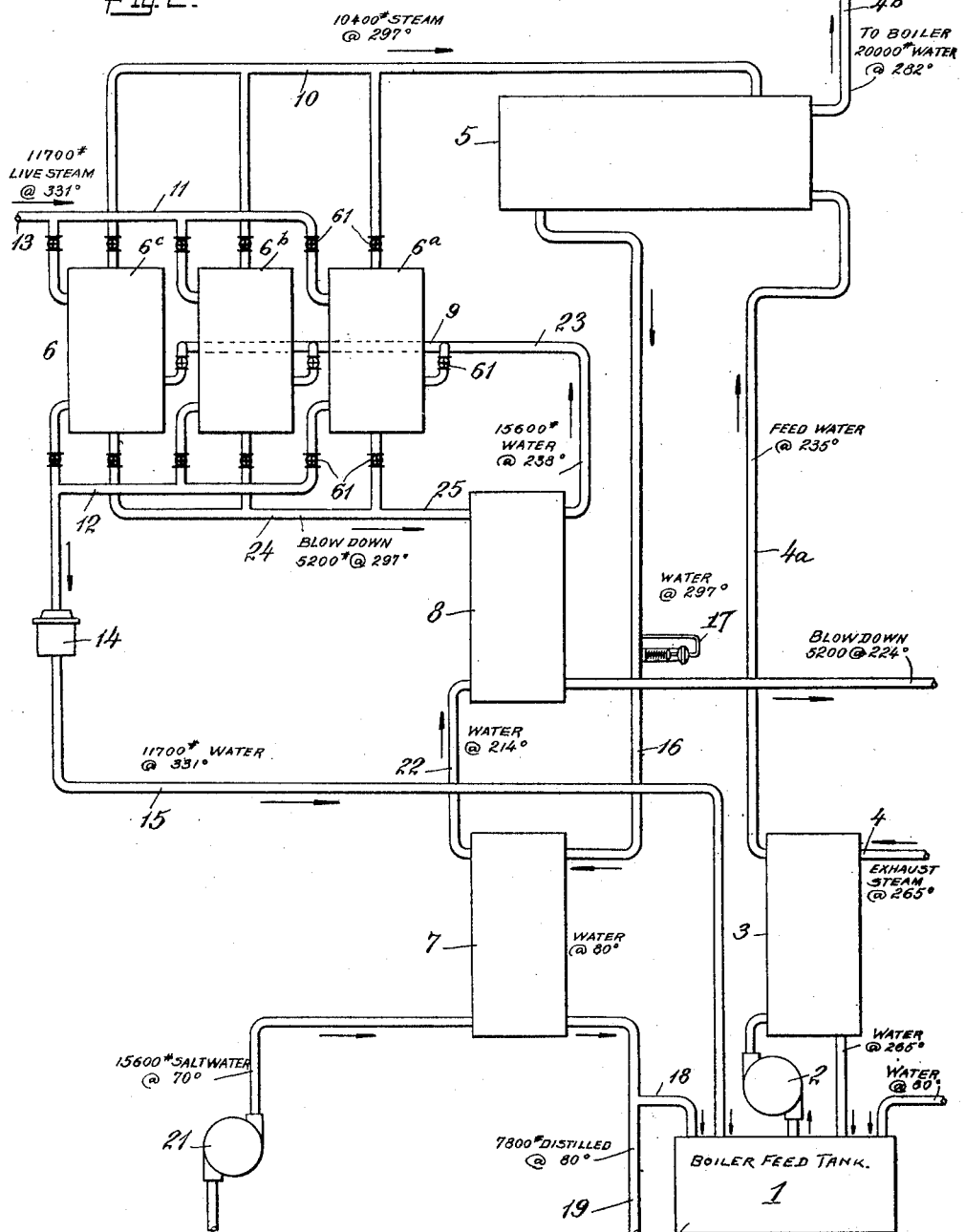

RUSSELL C. JONES, OF GARDEN CITY, NEW YORK, ASSIGNOR TO GRISCOM-RUSSELL COMPANY, A CORPORATION OF DELAWARE.

HIGH-HEAT-LEVEL EVAPORATOR SYSTEM.

1,328,998.     Specification of Letters Patent.     Patented Jan. 27, 1920.

Application filed January 26, 1916, Serial No. 74,426. Renewed November 4, 1919. Serial No. 335,748.

*To all whom it may concern:*

Be it known that I, RUSSELL C. JONES, a citizen of the United States, and a resident of Garden City, county of Nassau, and State of New York, have invented certain new and useful Improvements in High-Heat-Level Evaporator Systems; and I do hereby declare the following to be a full, clear, and exact description of the invention, such as will enable others skilled in the art to which it appertains to make and use the same.

This invention relates to a combined evaporator and boiler feed water heating apparatus for power plant service, either marine or stationary, and has for its object to effect the distillation of the necessary quantity of raw water to keep up the fresh water supply for the boilers and provide the fresh water consumed otherwise in the plant or on board the ship with a minimum heat loss and consequent greater economy of operation.

A further object of my invention is to provide a system of the character described, in which the evaporator plant is connected with the feed water heating system of the boilers in such manner that the steam from the evaporators is utilized in a high temperature condenser constituting a secondary boiler feed water heater, the system being arranged so that the latent heat of the steam generated in the evaporators, as well as the sensible heat in the water of condensation and in the blowdown from the evaporators is utilized in the system.

A further object of the invention is to provide a system of this character which is sufficiently flexible to admit of its adjustment to widely different boiler requirements under different conditions of service, the system selected for illustration being particularly designed for conditions met with in battleship service.

My invention will be best understood from a consideration of a typical battleship installation, and in the accompanying drawings I have indicated such installation, the legends of the two views indicating the operation under two different conditions of service.

In said drawings,

Figure 1 is a diagrammatic view showing the system in operation under full load condition; and Fig. 2 shows the system in operation under average load or "cruising speed" condition.

Referring to the drawings, and particularly to Fig. 1, 1 indicates the filter box or storage tank for the fresh water used in the boilers and from which the boiler feed water is drawn by pump 2, passing first to the main boiler feedheaters indicated diagrammatically at 3, and which may be of any preferred type in which the heating medium is exhaust steam. The heating medium of the main boiler feed heater 3 is the steam from what is known as the "auxiliary exhaust main" indicated at 4, which receives the exhaust steam of apparatus on ship board except the propelling engines. The latent heat of the exhaust steam is transferred to the boiler feed water in the heater 3 and the water of condensation is delivered directly to the filter box, where its sensible heat is conserved by adding to the initial temperature of the boiler feed water.

From the main or primary boiler feed water heater the feed water passes through line 4ª to the secondary boiler feed water heater 5, where its temperature is further raised by the latent heat of the steam from the evaporators 6. Any type of high temperature condenser may be used for the secondary boiler feed water heater in which the steam and water spaces are both designed for high pressures and temperatures.

The salt water for the evaporators is taken from the sea by pump 21, but instead of passing directly into the evaporators it is pre-heated before reaching the evaporators by a heater 7 which utilizes the sensible heat of the condensed water from the high temperature condenser, which is the distilled water from the evaporators. This heater reduces the temperature of the distilled water as low as possible and thereby saves the heat from that portion of the distilled water which is delivered to the storage tanks for general use. This heater is preferably of the type known in the trade as "counter-current" heaters, designed to effect a rapid transfer of heat between two fluids passing in opposite directions through the heater although the temperature difference is small. The salt water passes through the coils of the feed heater and out through the pipe 22 while the heating medium enters from the line 16 and is delivered in part through line 18 to the boiler feed tank 1 and in part through line 19 to a fresh water storage tank for other uses.

The evaporators 6 comprise preferably a number of units, 6a, 6b, 6c, connected to common manifolds 9 and 10 for the water to be evaporated, and manifolds 11 and 12 for the heating medium, the capacity of the evaporators being such that a portion only of the total number of units is necessary for the full capacity of the system. Each unit is provided with suitable cut-out valves, as indicated at 61, so that one or more of the units may be cut off from the group for cleaning or repair without interfering with those left in service.

The heating medium for the evaporators is live steam taken from the auxiliary live steam line 13 of the system and delivering its water of condensation to the filter box through a trap 14 in the delivery line 15, whereby the sensible heat of the water is utilized in raising the initial temperature of the boiler feed water.

The salt water feed for the evaporators is further pre-heated in a heater 8 which derives its heat from the "blowdown" of concentrated salt water from the evaporators, thereby utilizing a portion of the heat from the salt water which would otherwise be discharged at the temperature of the evaporators. In the drawings the coil of the heater 8 is shown connected to the evaporator feed manifold by pipe 23 and the heating chamber of the heater is connected to the evaporator blowdown manifold 24 by pipe 25. The evaporator feed heater 7 is heated, as stated above, from the water of condensation from the high temperature condenser, the line 16 connecting the shell of the latter to the heating chamber of the former containing a back pressure valve 17 whereby the operation of the entire system may be controlled as will later be described. It will be understood that the water of condensation from the main propelling engines is returned directly to the filter box from the main condensers. Such engines are usually multi-expansion engines or turbines in which the efficiency is dependent on the degree of vacuum maintained in the exhaust. It is impossible therefore to use the heat absorbed in the main condenser for any useful purpose, the condensation being effected by sea water in such volume as to receive no substantial increase in temperature during its passage through the condensers. In the installation selected for detail description herein, the exhaust is at a sub-atmospheric pressure corresponding to about 28 inches of mercury with a corresponding temperature of condensation of approximately 80°. Assuming the boilers under full load conditions to require 425,000 pounds of water per hour, that number of pounds less the small wastage which is made up from the evaporators will be returned from the main condensers and from the auxiliary exhaust and the auxiliary live steam condensed in the evaporators, directly to the filter box which will be maintained at a temperature of about 90°. The condensation of the auxiliary exhaust which is at a temperature of about 265° provides sufficient heat to heat the feed water for the boiler to about 235° before reaching the high temperature condenser.

For the full load conditions utilizing the large amount of water above stated, the pressure and therefore the temperature of the steam from the evaporators is set by the back pressure valve 17 at about 43 pounds gage corresponding to 290° temperature. Under such full load conditions the amount of water required from the evaporators is approximately 14,000 pounds per hour, the condensation of which in the secondary boiler feed heater or so called high temperature condenser will furnish sufficient latent heat to heat the feed water to about 265°.

To supply this quantity of distillate from the evaporators it is necessary to feed 21,000 pounds of salt water per hour to the evaporators so that at least one-third may be allowed for the "blowdown", that is, to be discharged as concentrated salt water, as any greater degree of concentration may produce undue scale, corrosion or priming in the evaporators. The temperature of the "blowdown" will of course be determined by the back pressure valve 17 which, as stated, is set to produce a temperature of about 290°; but to reduce the heat loss from the "blowdown" as far as possible, the blowdown is used as the heating medium for one of the evaporator feed heaters so that the final temperature of the blowdown is reduced to 220°.

Under the full load conditions assumed, it will require 15,900 pounds of steam from the auxiliary steam line at 90 pounds gage, corresponding to 331°, to provide the necessary heat for the evaporators, the water of condensation of auxiliary live steam from the evaporator being delivered at 331° to the filter box. The water of condensation from the high temperature condenser has its temperature reduced from 290° to substantially 80° in the primary evaporator feed heater. About 25% of the 14,000 pounds of water is delivered to the filter box at about 80° F., the rest of the water, about 10,500 pounds, being delivered to the distilled water storage tanks. It will be seen that the only heat losses in the system are the blowdown, 7,000 pounds at 220° which is 150° above the average initial temperature (70°) of the salt water feed and the 10,500 pounds of distilled water at 10° above its initial temperature which is delivered to the storage tanks, the heat in the distilled water delivered to the filter box being returned to the boilers.

Tabulating these figures, we have,

*Cost of operation—full load condition.*

| | |
|---|---|
| Blowdown—B. T. U.'s per hr.—7,000# × (220—70°) | 1,050,000 |
| Heat in distilled water—B. T. U.'s per hr.— at 80° returned to ship's tanks—75% × 14,000 (80°-70°) | 105,000 |
| Radiation—B. T. U.'s per hr.—(estimated) | 50,000 |
| Total heat loss—B. T. U.'s per hour | 1,205,000 |
| Total heat in steam from auxiliary main above 90° F.—B. T. U.'s per hour | 17,723,900 |
| Chargeable to evaporators (as above) | 1,205,000 |
| Returned to the system (93.2%) | 16,518,900 | or 1,205,000 B. T. U.'s per hour=1,076 pounds steam at 331°.

Pounds of steam per pound of distilled water $\frac{1076}{14000}=0.0768$.

In Fig. 2 I have illustrated the conditions of operation under less than full load, or "cruising speed condition" which shows how, by adjusting the pressure of the valve 17, substantially the same economy of operation may be had in the evaporators, the proportionately greater quantity of heat required by the evaporators being conserved in the form of a higher temperature in the feed water.

Under the particular conditions selected for illustration the boilers require 200,000 pounds of water per hour while the consumption of distilled water is approximately 10,400 pounds per hour. The valve 17 is set for 50 pounds gage pressure corresponding with 297° F. and the operating cost when tabulated is,

*Cost of operation—cruising speed conditions.*

| | |
|---|---|
| Blowdown—B. T. U.'s per hr.—5200× (224—70°) | 800,800 |
| Heat in distilled water—B. T. U.'s per hr.— at 80° returned to ship's tanks—75% × 10,400 (80°—70°) | 78,000 |
| Radiation—B. T. U.'s per hr.—(estimated) | 50,000 |
| Total heat loss B. T. U.'s per hour | 928,800 |
| Total heat in steam from auxiliary main B. T. U.'s per hour—above 90° F | 13,115,700 |
| Chargeable to evaporators (as above) | 928,800 |
| Returned to the system (92.9%) | 12,186,900 | or 928,800 B. T. U.'s per hr.=828 pounds steam at 331°.

Pounds of steam per pound of distilled water $\frac{828}{10,400}=0.0796$.

Multiple effect evaporators have, I am aware, been used in marine work to utilize some of the heat given off by the distillation of the water of vaporization. This system, however, is open to the objection that such evaporators occupy so much more room in proportion to their capacity that it is impossible to provide sufficient spare units to maintain full efficiency or avoid overloading the system when portions are cut off for cleaning or repairing. The single effect high temperature evaporators which I am able to use by reason of my heat-conserving system are extremely advantageous in keeping the area subject to scale, that is the salt water vaporizing coil area, down to the minimum. The effectiveness of the evaporators is further increased by pre-heating the salt water to a high temperature before reaching the evaporator so that the heat absorbed in the evaporator is practically all utilized in vaporizing the water. Furthermore no multiple effect system of which I am aware even approximates in economy of operation my improved system herein described.

Under conditions where the amount of distilled water required to be made is a large percentage of the total boiler feed water all the latent heat of condensation of the distilled vapor cannot be absorbed advantageously in the secondary or high temperature boiler feed heater. In such cases the system is amplified into two or more effects, only the vapor from the last effect passing to the secondary boiler feed heater, the vapor from the first effect and from successive intermediate effects, if such be used, being condensed in the usual manner in the next succeeding effect in the evaporator system. The sensible heat of the water of condensation from all the effects is then utilized in the evaporator feed heater as will be readily understood from the above description.

I claim:

1. In apparatus of the class described; the combination of a primary feed water heater for the main boiler feed; a secondary feed water heater arranged for the passage of water from the primary heater to the boiler; an evaporator plant for furnishing distilled water, said evaporator plant being connected to said secondary feed water heater so that the vapors from the evaporator constitute the heating medium of the feed water heater and are condensed in said secondary feed water heater; connections between the secondary feed water heater and the evaporator feed water heater, whereby the condensed vapors from the secondary feed water heater constitute the heating medium for the evaporator feed water heater; and means for maintaining the temperature of condensation in the secondary feed water heater at a higher temperature than the feed water delivered to the main boilers.

2. In an apparatus of the class described; the combination of a primary feed water heater for the main boilers; a reservoir from which fresh water is supplied to said primary feed water heater; an evaporator system for supplying distilled water to said tank, said evaporator system comprising vaporizing units and a condenser for condensing the vapor from said units, said condenser being arranged to provide a secondary feed water heater for the main boilers; a pipe for the condensed vapors from said condenser to said reservoir; a heat transferring apparatus having one side connected to said pipe and the other side connected to the feed water pipe of the evaporator system, whereby the sensible heat in the condenser will be utilized to heat the feed water for the vaporizing units; and a pressure regulating device in said pipe between the condenser and the heat transferring apparatus for maintaining the temperature of condensation of said vapors above the temperature of the feed water to the main boilers.

3. In a marine boiler and water supply system; the combination of a primary feed water heater for the main boilers adapted to be heated from the exhaust steam line; a reservoir from which distilled water is delivered to said primary feed water heater; a secondary feed water heater connected to receive the water heated by the primary heater and delivered to the boilers; an evaporator for supplying distilled water to said reservoir; connections between said evaporator and said secondary heater, whereby the latter constitutes the condenser for the evaporator; means for utilizing the sensible heat in the condensed vapors from the secondary heater for heating the feed water for the evaporator; a secondary feed water heater for the evaporator; means for utilizing the waste heat from the evaporator blow down in said secondary heater; and means for regulating the temperature of condensation in said secondary heater for the main boiler feed, whereby the temperature level of the system may be raised or lowered to permit an economical conservation of heat, notwithstanding the variations in the boiler feed consumption.

In testimony whereof I affix my signature.

RUSSELL C. JONES.